United States Patent [19]
Barker

[11] Patent Number: 5,481,797
[45] Date of Patent: Jan. 9, 1996

[54] LINK PIN DISPLACEMENT

[75] Inventor: David Barker, Burntwood, United Kingdom

[73] Assignee: Hydra-Tight Limited, England

[21] Appl. No.: 222,595

[22] Filed: Apr. 4, 1994

[30] Foreign Application Priority Data

Apr. 29, 1993 [GB] United Kingdom ............... 9308827

[51] Int. Cl.[6] .................................................. B23P 19/02
[52] U.S. Cl. ............................... 29/809; 29/252; 29/426.5
[58] Field of Search ........................ 29/244, 252, 426.5, 29/525, 809; 59/7, 8

[56] References Cited

U.S. PATENT DOCUMENTS

| | | | |
|---|---|---|---|
| 3,028,724 | 4/1962 | Kaplan et al. | 59/7 |
| 3,075,347 | 1/1963 | Bonifas et al. | 59/7 |
| 4,380,107 | 4/1983 | Andress | 29/252 |
| 4,704,780 | 11/1987 | Moffett | 29/252 |
| 4,870,739 | 10/1989 | Richards | 29/252 |

*Primary Examiner*—S. Thomas Hughes
*Attorney, Agent, or Firm*—Nixon & Vanderhye

[57] ABSTRACT

A long link pin for a vehicle track is extracted cold from interference fit in bosses by means of a high pressure, short stroke hydraulic ram mechanism which includes a guide tube defining a guide enclosure into which short drift blocks may be loaded through a window on successive ram reciprocations. The drift blocks stack to form a drift which displaces the link pin. One drift block is arranged to bridge the side boss and guide tube, providing lateral support for the apparatus. The exposed part of the drift is short, thereby reducing risk of bending, and the ram is always close to the pin irrespective of pin length making a compact length displacement arrangement.

20 Claims, 3 Drawing Sheets

LINK PIN DISPLACEMENT

TECHNICAL FIELD

This invention relates to the displacement of link or pivot pins of crawler vehicle tracks, heavy chains or the like, and in particular to an apparatus for effecting cold extraction or insertion of such a link pin which is retained by an interference fit.

BACKGROUND

In the case of such heavy duty link pin it is frequently necessary to remove a pin of several centimeters diameter that extends between bosses, in which it is an interference fit, spaced apart by tens of centimeters.

It is known to employ differential heating to the link pin and bosses to reduce the axial force required by a simple apparatus but such differential heat is difficult to effect and, if the pin is to be removed due to a defect in pin or boss that requires metallurgical examination, such application of heat would be inappropriate.

It is known to displace a link pin from a chain by means of an elongate drift pin of similar length, the drift pin being driven by an axially applied force by a rectilinearly stroked ram.

However, in the case of long link pins to which large forces have to be applied such an arrangement is impractical, both in terms of the difficulties in producing large forces and long strokes from ram means and the difficulties of ensuring that forces applied at the distant end of a long drift have no off-axis components which could lead to bending of the drift pin or even destruction of the apparatus and danger to personnel.

To avoid the stroke length difficulty a short stroke ram means could be employed and repositioned after each stroke, but the undesirability of applying large forces at the distant end of the drift still remains.

It is also known to apply axial force to such a long drift by means of a rotary transducer and screw thread connection which converts rotatary motion into axial force, but the force is still applied at the end of a long drift.

Although such apparatus is suited to inserting a link pin by substituting it for a drift used in extraction of a link pin, it will be appreciated that the forces involved in inserting a new link pin are usually lower than those of extracting an old one and that extraction, which is often conducted under unfavourable conditions and with inadequate space, may not be feasible with apparatus of such length.

SUMMARY OF THE INVENTION

It is an object of the present invention to provide an a link pin displacement arrangement for at least cold extraction of such a link pin that is of simple construction and easily operated within a confined space.

According to the present invention a link pin displacement arrangement suitable for cold displacement of a link pin extending between, and an interference fit in, through-bores of a first and a second side boss, comprises, (1) ram means, disposed facing the first side boss, including a ram body and a ram member reciprocable with respect to the ram body along a reciprocation axis in line with the link pin axis to be stroked towards said side boss from a retracted position, (2) a set of drift blocks stackable to form an axially extensive drift stack, said set including a plurality of drift blocks each having a length along said stack axis of less than the ram member reciprocation stroke, (3) axial support means for the ram means, including (i) stroke reaction means adapted to be located with respect to the second side boss to contact the latter by way of reaction control points about the bore and (ii) tie means extending between the stroke reaction means and the ram body to define a maximum spacing from the bore of the first side boss of the retracted ram of at least the length of a drift block, (4) lateral support means for the ram means coupled to the first side boss to maintain alignment between the ram member reciprocation axis and link pin axis, and (5) guide means extending from the ram means towards the first side boss to support at least one drift block between the retracted ram member and said first side boss, the ram member being reciprocable to effect, in stroking, a force on a drift block supported by the guide means to drive the stack of drift blocks including said supported block into the bore of the first side boss, and, in retracting, opening of a space between the end of the stack and the ram member for the guide means to receive and support another drift block.

The guide means may be fixed with respect to the ram body and define a guide enclosure along which the ram reciprocates.

Alternatively, the guide means may be fixed with respect to the ram member and reciprocated therewith.

Embodiments of the invention will now be described by way of example with reference to the accompanying drawings, in which:

DETAILED DESCRIPTION OF THE DRAWINGS

Figure 1:
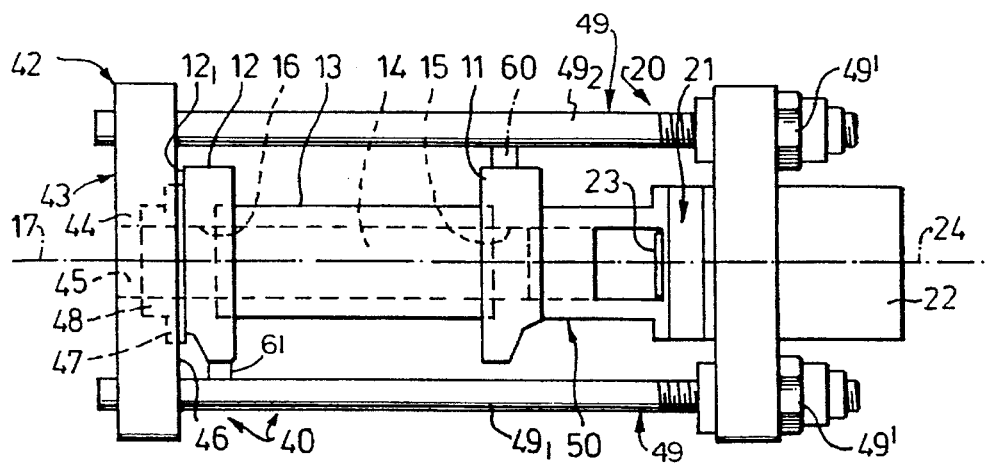
FIG. 1 is a side view of a portion of crawler track showing a pair of spaced side bosses, between which extends a link pin, and link pin displacement arrangement, in accordance with a first embodiment of the present invention, in the form of a link pin extractor having ram means, comprising a ram body and ram member, and guide means that is fixed with respect to the ram body and extends to a first side boss to defining a guide enclosure along which the ram member reciprocates.

Referring to FIG. 1 a segmented track of a track-laying or crawler vehicle includes first and second side bosses 11 and 12 respectively separated by a spacer tube 13 through which a link pin 14, indicated by broken lines, extends between, and is an interference fit in, bores 15, 16 in the side bosses 11, 12 respectively. The link pins has a longitudinal axis 17.

Link pin displacement apparatus, comprising an extractor of the link pin, in accordance with the present invention is shown generally at 20 in operative disposition with respect to the track. It comprises a ram means or assembly 21 facing the first side boss 11 including ram body 22 and a ram member 23 reciprocable with respect to the ram body along a reciprocation axis 24 in line with the link pin axis 17 to be stroked from a retracted position shown.

Figure 2:
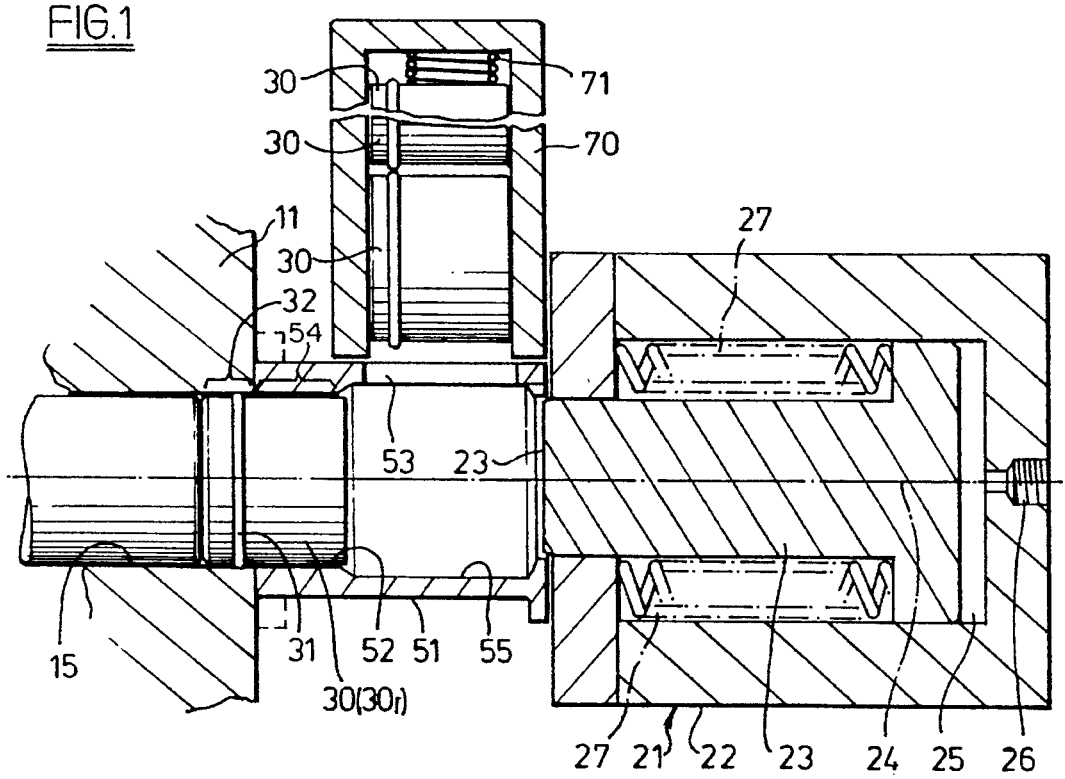
FIG. 2 is a sectional elevation of the extractor of FIG. 1 rotated 90° about the ram member axis with the ram member in a fully retracted position, illustrating the disposition of drift blocks in the guide enclosure and forming a drift stack extending to the side boss to define with the guide means lateral support means locating the ram in alignment with the pin axis, and a magazine of drift blocks for automatic loading of the guide enclosure.

Referring also to FIG. 2, the ram assembly 21 is shown as comprising a piston and cylinder arrangement, the ram member 23 comprising the piston and ram body 22 comprising the cylinder and between them defining a chamber 25 to which hydraulic fluid at elevated pressure is supplied by way of duct 26 to displace the piston towards the second side boss 12, and from which the fluid is vented by return springs 27 acting on the piston (or possibly suction) to retract the ram, the extremes of piston travel defining the ram stroke length.

Figure 3:
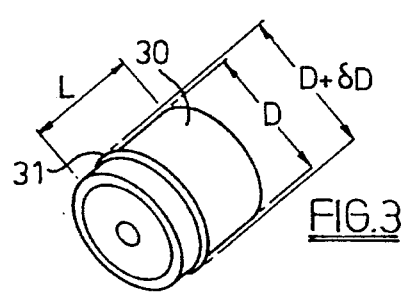
FIG. 3 is a perspective view of a stackable drift block containable and slidable along the guide enclosure of FIG. 1.

Referring to FIG. 3 the extractor also includes a set of drift blocks stackable to form an axially extensive drift. The set includes a plurality of drift blocks, one of which is shown at 30, each having a length L along the stack axis of less than the ram member reciprocation stroke. Each block is of circular cross-section in order to bear fully on the link pin and conveniently, in order to transmit large compressive forces to the large diameter pins, its length may be shorter than its diameter D.

As will become clear, each drift block as part of the drift stack is required to enter the bore of the first and second side bosses and desirably with a frictional fit sufficient to prevent inadvertent withdrawal. To achieve such effect each block has a basic diameter D that makes it a clearance fit in the bore and has at least one deformable surface projection that is deformable by the bore to effect the frictional engagement. Conveniently, one deformable surface projection is provided for each drift block by a resilient o-ring 31 extending in a locating groove about the periphery of the block. Thus for a drift block optimized for a boss bore diameter D the block of length L has elevation dimensions L×(D+δD) where δD is the increase in diameter due to the un-deformed surface projection.

The extractor 20 also includes axial support means for the ram assembly indicated generally at 40. The axial support means includes stroke reaction means 42 adapted to be located with respect to the second side boss 12 to contact the latter by way of reaction contact points about the bore 16. The stroke reaction means comprises reaction plate arrangement 43 having a body 44 apertured at 45 coaxially with the bore 16 and a face 46 adapted to conform to, and bear against, the surface $12_1$ of the side boss 12. The face 46 is formed by a removable face plate 47 including flanged aperture 48 which is received in the body aperture 45 to locate the plate with respect to the body.

In addition to the stroke reaction means, the support means also includes tie means 49 in the form of two (or more) tensile tie bars $49_1$, $49_2$ extending between the stroke reaction means 42 and the ram body 22 to define a maximum spacing from the bore of the first side boss 11 of the retracted ram, such maximum spacing being at least the length of a drift block 30.

Guide means 50, removably fixed to the ram body 22 extends towards the first side boss 11. The guide means is arranged to extend from the ram body for a distance of less than the length (L) of one drift block in excess of the ram stroke length, that is, approximately 2.5L overall, and the axial support means is arranged to dispose the ram means with respect to the first side boss 11 whereby the stroked ram member is less than the length of one drift block from the bore of the first side block. Conveniently, the disposition of the ram means is such that the guide means is in abutment with the first side boss.

The guide means 50 comprises a tubular body 51, coaxial with, and surrounding, the reciprocation axis 24 to define a guide enclosure 52, in which at least one drift block 30 can be supported between the ram member and the first side boss 11 and along which a drift block can slide axially. The tubular body is apertured laterally of the axis at window 53 for loading of drift block 30 thereinto.

The guide means defines an end portion 54 of the enclosure defined by tubular body 51 proximate the first side boss 11 of substantially the same cross-sectional dimensions as the bore 15 of the side boss and the dimensions extend along the guide means towards the portion 55 containing the loading aperture which has, like the aperture, length L and diameter (D+δD) to receive a drift block 30 with the surface projection 31 thereof undeformed.

In operation the extractor is set up in relation to the side bosses 11 and 12 such that the ram reciprocation axis 24 is in line with the link pin 17 axis and the ram body 32 is drawn along the tie bars 49, and $49_2$ by nuts 49' until the stroke reaction means 52 abuts the second side boss 12 and the guide means 50 abuts the first side boss 11 and a small tension is induced in the tie bars, introducing a low compression into the guide means.

In such condition, the extractor is supported against axial motion in either direction and engagement between the guide means 50 and first side boss 11 may even permit it to withstand lateral forces, such as its own weight. If necessary, the lateral support means may include support augmenting coupling wedges 60, 61 between the tie boss and the side bars to restrict rotation of the extractor about an axis perpendicular to the link pin axis under gravitational or any other disturbance force.

Lateral support means for the ram means 21, to maintain alignment between the ram member reciprocation axis 24 and link pin axis 17, is mainly provided operationally by the guide means 50 in conjunction with the stack of drift blocks, as will become apparent from consideration of a link pin extraction operation.

With reference particularly to FIG. 2, the positioned extractor has the ram member 23 fully retracted in the ram body. Initially the guide means 50 is caused to contain a drift stack comprising an initial drift block $30_1$ which is identical with, or possibly longer than, the other drift blocks 30. This initial drift block may be inserted into the end of the guide means during assembly and disposition if the ram means or of a single block 30 may be loaded by way of the window 53.

The ram member 23 is stroked such that it acts on the end of the initial drift block $30_1$ and the drift stack defined thereby is displaced towards the side boss 11, the exposed end of the stack entering the bore 15 and displacing the link pin 14 towards the first side boss 11 against which the ram force is reacted by stroke reaction means 42.

The length of the initial drift block 30 is a matter of choice provided that the length of guide enclosure unfilled is less than the stroke of the ram, and preferably less by an amount that, when the ram is stroked, the end of the block is caused to enter the bore 15 to such an extent as to form an effective frictional engagement with the boss bore.

When the ram is fully retracted a space is opened in the guide enclosure equal to the stroke length adjacent the loading window 53. A new drift block 30 is then loaded by way of window 53 into part 55 of the guide enclosure and the ram member stroked to cause the block to become added to the stack (as formed by the initial drift block), the drift formed by the stack then being pushed by the ram member further into the bore 15 for the length of the ram stroke. The ram is then retracted and a further space is opened in the guide enclosure equal to the stroke length whereupon a new drift block is added and the above procedure repeated until the link pin 14 is pushed out through the stroke reaction means 42 and replaced by the drift of equivalent length formed by the stack of drift blocks.

It will be appreciated that once the initial drift block 30 has been driven into the bore of the first side boss 11 so that the drift stack extends in both guide means and side boss bore, the particular drift block bridging them provides a significant degree of lateral support for the extractor against external forces. Furthermore the displacement of the ram means from the side boss, and length of drift stack outside of the side boss bore is kept to a minimum.

As indicated above, the initial drift block $30_1$ may comprise a unitary block 30 of length L, that is a special block of between one and two block lengths, and the guide means be of minimal length, enabling the ram means to be disposed very close to the first side boss. However, if it is desired or necessary for any reason to dispose the ram means any further from the first side boss it is possible to have guide means that is longer by an integral multiple of drift block lengths, that is, 2.5 L, 3.5 L etc, and with the retracted position of the ram member being likewise further displaced from the first side boss.

In such a case, the initial drift block, which must leave less than block length L in the guide enclosure when the ram member is fully stroked, may comprise a stack of two (or more) drift blocks 30 instead of a longer unitary block.

It will also be appreciated that good lateral support is provided by the guide means and side boss bore both surrounding a single drift block. It is, however, possible to have the guide means terminate further away from the first side boss such that a junction between blocks is exposed between the boss bore and the guide means, if the blocks of the stack are profiled or otherwise interlocked to stack such as to withstand lateral forces at a junction between the blocks.

Furthermore, if such an interlocking stacking arrangement is provided, the guide means may take an alternative form in which it is operationally fixed in relation to the ram member instead of the ram body.

Figure 4A:
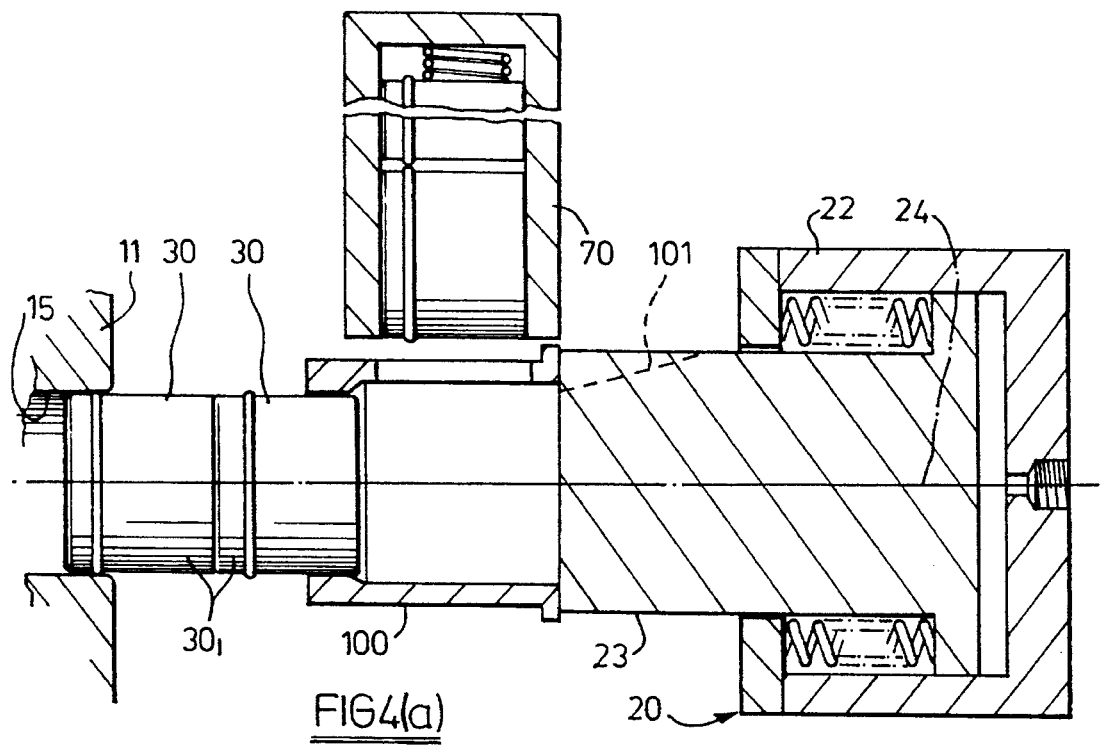
FIG. 4(a) is a sectional elevation, similar to FIG. 2, of a second embodiment of the invention in the form of a link pin extractor in which the guide means is fixed with respect to the ram for reciprocation therewith.

Referring to FIG. 4(a), which is similar to the sectional elevation of FIG. 2 and corresponding parts are given the same reference numbers, the guide means 100 is releasably secured to ram member 23 for reciprocation therewith and corresponds to the guide means 50 in terms of loading aperture and internal dimensions. It extends from the ram member 23 for a distance in excess of the ram stroke length. The axial support means is arranged to dispose the ram means with the retracted ram member position, shown, displaced from the bore of the first side boss 11 such that the end of the guide means is spaced therefrom by no less than the ram member stroke length to enable the ram member 23 to be reciprocated without fouling the first side boss 11.

As the stroke length exceeds the length of each drift block 30, it follows that with the ram member 23 retracted an exposed part of the stack of drift blocks contains a junction between the two blocks and the interlock of the drift blocks must provide for this. Similarly, when the ram 23 is retracted, the guide means, at least at the end, may exert a tensile force on the stack so that interlocking to inhibit separation of drift blocks under such tensile force is also required.

Figure 4B:
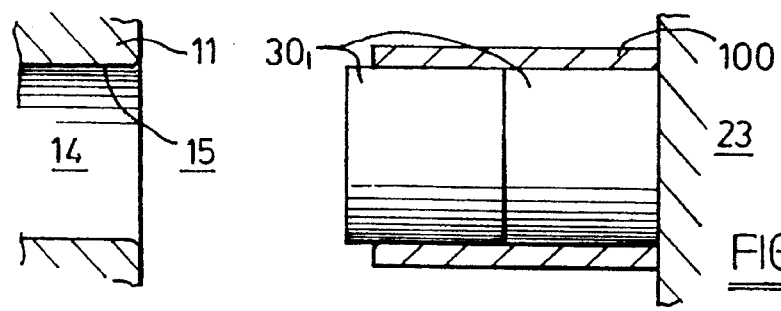
FIGS. 4(b) to 4(g) are schematic sectional elevation views of the stages of operation of the extractor of FIG. 4(a)
Figure 4C:
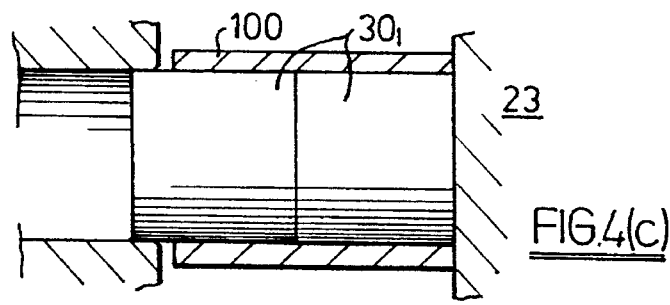
Figure 4D:
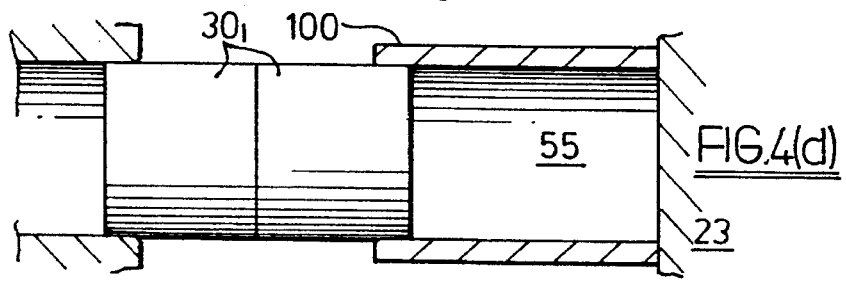
Figure 4E:
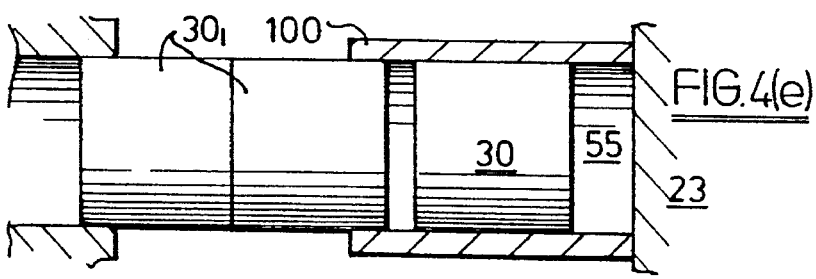
Figure 4F:
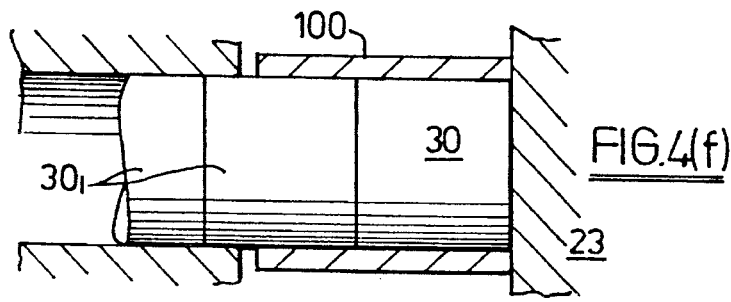
Figure 4G:
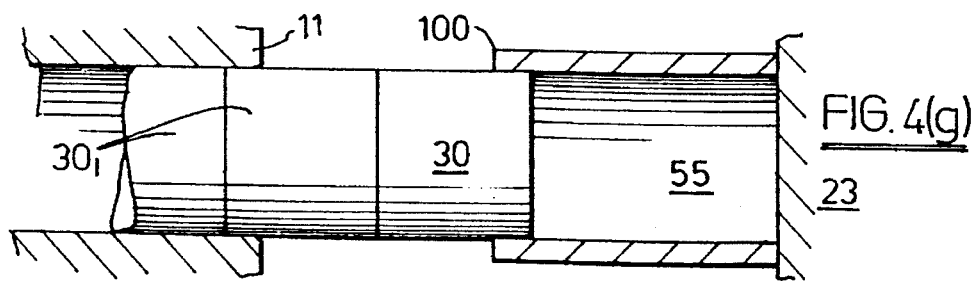

The disposition of the guide means and drift blocks 30, $30_1$ in relation to reciprocation of the ram member 23 is illustrated schematically in FIGS. 4(b) to 4(g). It will be appreciated that for a stack of drift blocks to engage with the bore in the first side boss, the length of the initial drift block $30_1$ must exceed the length of the guide means (or the distance of the stroked ram member from the first side boss) and so may comprise a stack of two drift blocks 30 as shown in FIG. 4(b) or a unitary drift block of comparable length. FIGS. 4(b) to 4(e) demonstrate initial reciprocation with the initial drift block $30_1$ loaded into the guide means and exceeding the length thereof, FIG. 4(c) demonstrating how the end of the drift stack formed by the initial drift block 30 enters the first boss at maximum ram member stroke and FIG. 4(d) demonstrating how when the ram 23 is retracted a space is opened in the guide means for loading a new drift block, illustrated at FIG. 4(e). FIGS. 4(e) to 4(g) demonstrate continuation of the above procedure for drift blocks 30 added individually after each reciprocation of the ram member 23.

Having given basic arrangements of link pin displacement means in the form of an extractor it will be appreciated that many variations may be effected without departing from the scope of the invention.

For example, referring to FIG. 2, a magazine 70 may contain a plurality of drift blocks 30 and be disposable adjacent the guide means 50 so as to be aligned with the loading window 53 when the ram 23 is fully retracted.

The magazine may contain bias means such as spring 71, or rely upon gravity if suitably orientated, to load a drift block 30 into the empty guide chamber each time the retracted ram 23 aligns the window with it. It will be seen that such a magazine is also suitable for use with the actuator guide means 100 of FIG. 4, although in view of the movement of the window with the guide means and ram, the guide means and/or edge of the ram may be chamfered as indicated at 101 to prevent interference of the next waiting drift block with stroking of the ram. It will be appreciated that the guide means, maybe formed separately from the ram means 21 and removably attached thereto may be selected with drift blocks of corresponding diameter in accordance with the diameter of the link pin 14 to be removed. Alternatively, it may be formed integrally with the same means.

It will further be appreciated that the ram means 21 may also take other forms. For instance the ram member may be part of the cylinder body whilst the ram body comprises the piston. The ram may be operated pneumatically rather than hydraulically, if sufficient force is attainable, or may comprise other than a piston and cylinder arrangement. The ram member may be stroked by other than fluid pressure, such as by one or more jack screws extending through the ram body means or even by comprising such a jack screw or nut carried by such a screw which is stroked by rotation of the screw with respect to the ram body.

Similarly, the tie means may comprise other than tie bars and the tie means and stroke reaction means may comprise a unitary framework.

As mentioned above, some constructions may require the individual drift blocks to interlock with others to form a stack that comprises a drift able to transmit considerable compressive forces whilst having sufficient strength in a lateral and tensile direction that the last-added block, which is not engaged within the bore of the boss, retains the integrity of the stack. The axial faces of each block may have a co-operative projections and recesses which interengage and locate by suitable detent means, although it is then necessary to ensure that the end of the ram means and/or the link pin conforms to the profile of the block face or bridges any recess, bearing in mind reductions in contact area over which force is transmitted.

Such detent means may comprise spring loaded detent activated by axial force alone, or by a screw threaded engagement. Conveniently such screw threading would involve minimal rotation of the block, such as by making a conical and/or broken thread, as in a breech block. Furthermore, such rotation as is required may be effect manually when the drift block is loaded to add it to the stack prior to ram pressure being applied or may be effected as a first part of ram stroke, such as by rifling the chamber wall or introducing rotation of the ram itself.

The above description has related to link pin displacement means confined to the role of an extractor of such a pin.

The operating principle, including a short stroke ram means, lends itself also to insertion of a link pin, although some of the compactness associated with extraction alone in inevitably lost due to the length of the new link pin.

In general terms the structure and operation of a link pin insertion arrangement is as described above except that the initial drift pin comprises the ram link pin and the axial support means is arranged to support the ram member at a correspondingly increased distance from the first side boss. Also, unless it is desired to rely upon lateral loading of drift blocks exposed between the guide means and the first side boss, the guide means is correspondingly longer in order to extend thereto.

Figure 5:
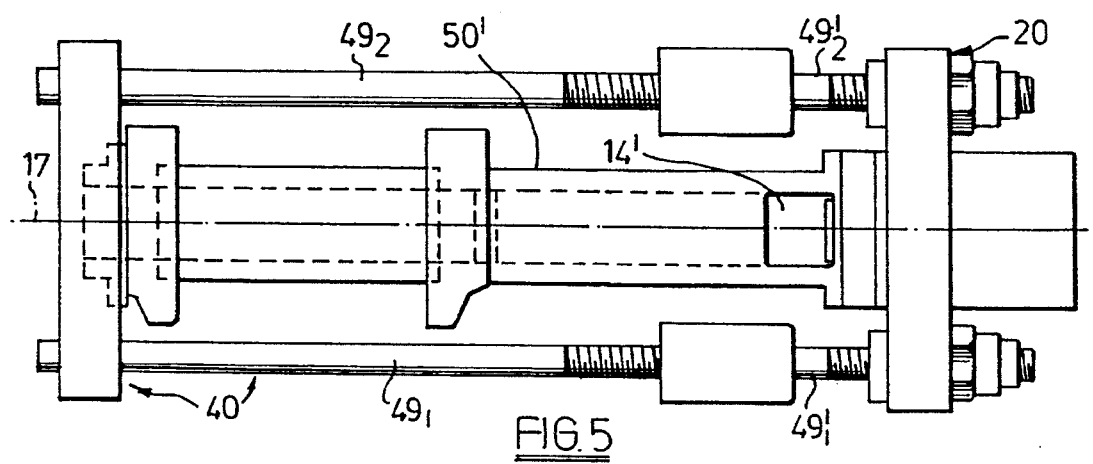
FIG. 5 is a side view similar to FIG. 1 but showing the link pin displacement arrangement adapted for insertion of a link pin between the side bosses.

Referring to FIG. 5, which contains many parts identical with FIG. 1 and numbered the same, the ram means 20 is disposed further from the first side boss 12 by extending the tie bars 49$_1$, 49$_2$ by auxiliary tie bars 49$_1$' and 49$_2$' respectively and securing a longer guide means 50' to the ram body. The guide means is of such length as to define a guide enclosure which is filled with a replacement link pin 14' shown by broken lines. The guide means 50' contains the usual loading aperture adjacent the retracted position of the ram member and preferably, but not essentially, extends into abutment with the side boss 11. The ram member is reciprocated, the ram stroke displacing the initial drift block/link pin by more than the length of a normal drift block 30 so that it extends into the bore 15 of boss 11. When the ram member is retracted a drift block 30 is loaded by way of the operation to stack with the initial drift block/link pin, thereafter repeated ram reciprocation and drift block loading causing the full length of the link pin to be displaced into the bore of first side boss 11 and extend between it and second side boss 12.

It will be appreciated that as the ram can be reciprocated rapidly and drift blocks loaded rapidly the new link pin may be inserted quickly from a magazine, such as that shown at 70 in FIG. 2, with no constant adjustment of the supported position of the ram means despite the relatively short stroke length of the ram means.

Thus apart from the extended length, or extensions to, the tie means and guide means, the arrangement for link pin inserter is the same as for extraction, but extraction, wherein larger axial forces are to be anticipated, is able to be effected with very much shorter apparatus and the ram means disposed very much closer to the end of the side boss.

It will be understood that none of the alternatives included are to be considered exhaustive of all possibilities.

I claim:

1. A link pin displacement arrangement suitable for cold displacement of a link pin extending between, and an interference fit in, through-bores of a first and a second side boss, comprising (1) a ram assembly, disposed facing the first side boss, including a ram body and a ram member reciprocable with respect to the ram body along a reciprocation axis in line with the link pin axis to be stroked towards said first side boss from a retracted position, (2) a set of drift blocks stackable to form an axially extensive drift stack, said set including a plurality of drift blocks each having a length along said stack axis of less than the ram member reciprocation stroke, (3) axial support means for axially supporting the ram assembly, including
      (i) a ram stroke reactor located adjacent to the second side boss for contacting the latter by way of reaction control points about the through-bore of said second side boss and
      (ii) tie means extending between the ram stroke reactor and the ram body for defining a maximum spacing from the bore of the first side boss of the retracted ram of at least the length of one of said drift blocks, (4) lateral support means coupled to the first side boss for maintaining alignment between the ram member reciprocation axis and link pin axis, and (5) guide means extending from the assembly towards the first side boss for supporting at least one drift block between the retracted ram member and said first side boss, the ram member being reciprocable to effect, in stroking, a force on a drift block supported by the guide means to drive the stack of drift blocks including said supported block into the bore of the first side boss, and, in retracting, opening of a space between the end of the stack and the ram member for the guide means to receive and support another drift block.

2. A displacement arrangement as claimed in claim 1 in which said lateral support means includes the guide means.

3. A displacement arrangement as claimed in claim 2 in which said guide means extends from the ram body to the first side boss and is subjected by the axial support means to compression along the ram reciprocation axis to clamp the guide means to the first side boss.

4. A displacement arrangement as claimed in claim 2 in which the guide means is fixed with respect to the ram body and extends therefrom for a distance in excess of the ram stroke length whereby a part of the stack of drift blocks extends between the first side boss bore and the guide means.

5. A displacement arrangement as claimed in claim 4 in which the guide means is arranged to extend from the ram body for a distance of less than the length of one drift block in excess of the ram stroke length and the axial support means is arranged to dispose the ram assembly with respect to the first side boss whereby the distance between the through-bore of said first side boss and the ram is less than the length of one drift block.

6. A displacement arrangement as claimed in claim 4 in which the guide means is arranged to extend into abutment with the first side boss.

7. A displacement arrangement as claimed in claim 2 in which the guide means is fixed with respect to the ram member and extends therefrom for a distance in excess of the ram stroke length and the axial support means is arranged to dispose the ram assembly with the retracted position of the ram member displaced from the bore of the first side boss such that a part of the stack of drift blocks extends between the first side boss bore and the guide means.

8. A displacement arrangement as claimed in claim 7 in which the stroke length is substantially equal to the block length and the guide means is of axial length greater than the length of one drift block but less than the axial length of two drift blocks.

9. A displacement arrangement as claimed in claim 1 in which the guide means is removably fixed to the ram assembly.

10. A displacement arrangement as claimed in claim 1 in which the guide means comprises a drift block enclosure, coaxial with and surrounding the reciprocation axis, dimensioned to contain a drift block and permit a drift block therealong, said enclosure also being apertured laterally of said axis to provide a loading aperture for loading of a drift block thereinto.

11. A displacement arrangement as claimed in claim 10 in which the guide means comprises a closed tubular body and loading aperture comprises a window in the body wall.

12. A displacement arrangement as claimed in claim 10 in which each drift block has a cross-sectional shape, the drift block enclosure of the guide means conforms to the cross-sectional shape of the drift blocks, the guide enclosure and drift blocks are relatively dimensioned with respect to a link pin with which used such that each block is a frictional fit with respect to the through-bores in said first and second side bosses and each drift block has at least one deformable surface projection deformable by the through-bore of said first side boss to effect frictional engagement therewith.

13. A displacement arrangement as claimed in claim 12 in which the end portion of the guide means proximate the first side boss defines an enclosure of substantially the same dimensions as the bore of the first side boss.

14. A displacement arrangement as claimed in claim 12 in which the drift blocks are adapted to interlock with each other to inhibit separation transversely to, and/or along, the reciprocation axis.

15. A displacement arrangement as claimed in claim 1 in which the tie means comprises two or more tensile tie bars extending from the ram stroke reactor substantially parallel to the link pin axis and upon which the ram assembly is supported with respect to said first side boss.

16. A displacement arrangement as claimed in claim 1 in which the ram stroke reactor comprises a reaction plate adapted to bear against the face of the second side boss remote from the first side boss.

17. A displacement arrangement as claimed in claim 1 in which at least one of the axial support means and the lateral support means includes a support augmenting coupling extending between the tie means and at least one of the side bosses.

18. A displacement arrangement as claimed in claim 1 in which the ram assembly comprises, as said ram member and ram body, a piston and cylinder arrangement defining a fluid chamber responsive to applied fluid pressure therein to stroke said ram member.

19. A displacement arrangement as claimed in claim 1, wherein the set of drift blocks includes a magazine containing said plurality of drift blocks disposed adjacent a loading aperture in the guide means such that upon retraction of the ram member, a drift block can be loaded into said space.

20. A displacement arrangement as claimed in claim 1 in which the set of drift blocks includes an initial drift block of greater length than remaining drift blocks in said set of drift blocks, arranged to be supported by the guide means prior to a first reciprocation of the ram member and of such length as to extend between the first side boss bore and guide means upon said first reciprocation.

* * * * *